United States Patent [19]

Harrison

[11] 4,065,627

[45] Dec. 27, 1977

[54] HIGH MOLECULAR WEIGHT RADIATION CURABLE RESINS

[75] Inventor: Stuart A. Harrison, Minneapolis, Minn.

[73] Assignee: General Mills Chemicals, Inc., Minneapolis, Minn.

[21] Appl. No.: 726,730

[22] Filed: Sept. 27, 1976

[51] Int. Cl.$^2$ .............................................. C07C 125/06
[52] U.S. Cl. ................................. 560/26; 204/159.22; 260/77.5 AN; 560/88; 560/115; 560/158; 560/196
[58] Field of Search ............ 260/468 E, 471 C, 482 B

[56] References Cited

U.S. PATENT DOCUMENTS

| | | | |
|---|---|---|---|
| 3,872,150 | 3/1975 | Kehr et al. ....................... | 260/468 E |
| 3,907,865 | 9/1975 | Miyata et al. ..................... | 260/471 C |
| 3,979,426 | 9/1976 | Demajistre ................... | 260/471 C X |
| 3,991,024 | 11/1976 | Nakamoto et al. .......... | 260/471 C X |

*Primary Examiner*—Richard L. Raymond
*Attorney, Agent, or Firm*—Elizabeth Tweedy; Patrick J. Span

[57] ABSTRACT

High molecular weight radiation curable ester-diethers, ester-monoethers and their diisocyanate derivatives.

2 Claims, No Drawings

HIGH MOLECULAR WEIGHT RADIATION CURABLE RESINS

STATEMENT OF THE INVENTION

This invention relates to compositions of matter which upon exposure to radiation cure to form resins. These compositions of matter are useful as ink components. More especially, this invention relates to (A) ester-diethers and ester-monoethers having the structural formula:

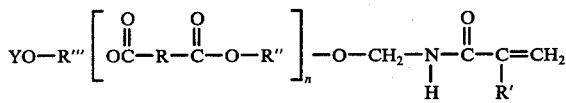

wherein Y is hydrogen or

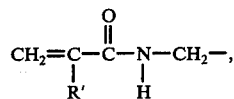

R is an aliphatic hydrocarbon or aromatic hydrocarbon group containing four to eight carbon atoms, R' is hydrogen or a methyl group, R'' is an aliphatic hydrocarbon groups containing two to eight carbon atoms with the proviso that the aliphatic hydrocarbon group can contain ether linkages and R''' is an aliphatic hydrocarbon group containing two to eight carbon atoms with the proviso that the aliphatic hydrocarbon group can contain ether linkages, R'' and R''' when containing ether linkages can have the formulae $-(R_a-O-R_b)-$, $-(R_a-O-R_b-O-R_c)-$ or $-(R_a-O-R_b-O-R_c-O-R_d)-$ wherein $R_a$, $R_b$, $R_c$ and $R_d$ are alkylene groups containing in total from four to eight carbon atoms and n is an integer from two to five, and mixtures thereof and (B) the ester-monoether shown in A reacted with a diisocyanate and (C) a mixture including 1. a mixture of ester-diether and ester monoether compositions as set out above in A and
2. a monohydroxy hydrocarbon ester of acrylic or methacrylic acid having the structural formula:

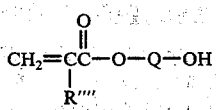

wherein R'''' is hydrogen or methyl group and Q is an aromatic hydrocarbon group, cycloaliphatic hydrocarbon group or a straight chain aliphatic hydrocarbon group containing from 2 to 15 carbon atoms, wherein said ester-monoether and said monohydroxy hydrocarbon acrylate or methacrylate is reacted with a diisocyanate.

BACKGROUND OF THE INVENTION

Some compositions are known which cure to form resins upon exposure to radiation and are useful in inks. These compositions have relatively low molecular weight and exhibit low viscosities. Low molecular weight materials cure relatively slowly. In addition inks exhibiting low viscosities tend to fill in fine type and do not produce sharp images. The resins of this invention overcome the disadvantages of known compounds.

SUMMARY OF THE INVENTION

The ester-diether having the structural formula shown in (A) above cures upon exposure to radiation to form resins. The ester-monoether also cures upon exposure to radiation and is useful as an ink component. The ester-diether and mixtures of the ester-diether and ester-monoether are useful components of lithographic inks. The mixtures exhibit higher viscosities and therefore are particularly beneficial in producing fine type images. They also have relatively high molecular weights which promote rapid curing. For purposes of making inks, it is preferable that the mixtures of ester-diether and ester-monoether contain at least 30% by weight of the ester-diether.

The diisocyanate derivative of the ester-monoether has the structural formula shown in FIG. 1.

FIGURE 1

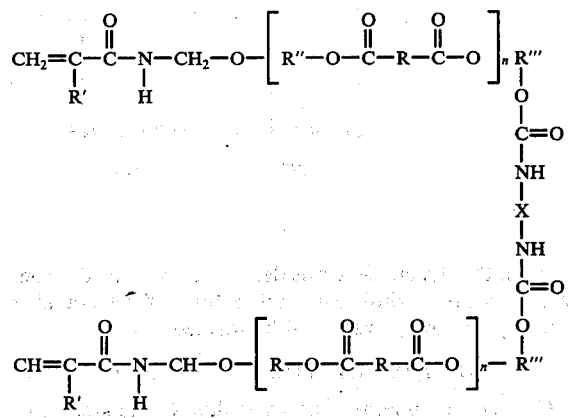

wherein X is an aromatic hydrocarbon, cycloaliphatic hydrocarbon or aliphatic hydrocarbon group containing 4 to 38 carbon atoms and R, R', R'', R''' and n are as described above. The ester-diether component of the mixture remains unchanged.

The diisocyanate derivatized mixture of the ester-diether and ester-monoether exhibit higher viscosities than the initial mixture of ester-monoether and ester-diether. The high viscosities make the composition particularly adapted for inks, particularly lithographic inks, which are to be applied mechanically and which must stay in place and not run or drip even though wet. In addition, the diisocyanate derivatives cure faster upon exposure to radiation than the ester-monoethers and ester-diether mixtures themselves. Finally, the film obtained from the diisocyanate derivatized mixture are tougher and harder films than those produced from the ester-monoether and ester-diether mixtures themselves.

Optimum properties useful in lithographic inks are exhibited by the derivatized mixture obtained by reacting a mixture of the ester-monoether, ester-diether and a monohydroxy hydrocarbon ester of acrylic or methacrylic acid having the structural formula shown above with a diisocyanate. Typical of hydroxyalkyl acrylate esters that can be used are monohydroxyethyl acrylate, and hydroxypropyl methacrylate, and typical of monohydroxyaromatic acrylate or methacrylate ethers that can be used is hydroxybisphenyl acrylate. As in the derivatized ester-monoether and ester-diether, the ester-diether component remains unchanged. The ester-monoether and the monohydroxy hydrocarbon acrylate or methacrylate react with the diisocyanate. The ester-monoester derivatizes to form the component shown in FIG. 1. The monohydroxy hydrocarbon acrylate or methacrylate esters form urethanes having the structural formulae shown in FIG. 2.

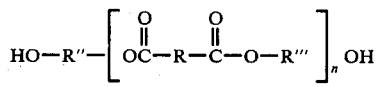

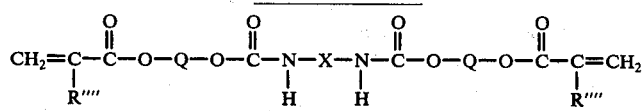

FIGURE 2

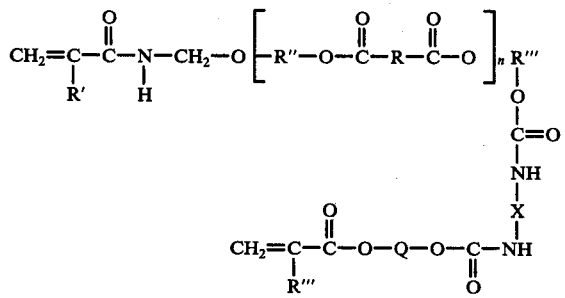

wherein R''', Q, and X are as defined above. In addition, urethanes having different combinations of the available hydroxy bearing groups will be formed.

DETAILS OF THE INVENTION

The ester-monoether and ester-diether and mixtures thereof shown in (A) above can be prepared by first reacting a dicarboxylic acid with a glycol to form a hydroxyalkyl dicarboxylic acid ester and subsequently reacting the hydroxy hydrocarbon dicarboxylic acid ester with a mixture of acrylamide and formaldehyde to form the ester-monoether and ester-diether of this invention.

PREPARATION OF THE HYDROXYALKYL DICARBOXYLIC ACID ESTER

The hydroxyalkyl dicarboxylic acid ester can be prepared by reacting dicarboxylic acids having the structural formula:

wherein R is an aliphatic hydrocarbon or aromatic hydrocarbon group containing four to eight carbon atoms with a glycol containing two to eight carbon atoms. Dicarboxylic acid useful in making the hydroxyalkyl dicarboxylico acid esters include adipic, pimelic, suberic, maleic, fumaric, azelaic, sebacic, isophthalic and terephthalic acid. Glycols useful as starting materials include ethylene glycol, diethylene glycol, triethylene glycol, tetraethylene glycol, propylene glycol, dipropylene glycol, butylene glycol and dibutylene glycols, hexylene glycol, heptylene glycol and octylene glycol.

The reaction can be conducted by heating the reactants to a temperature between about 100° to 170° C. The product formed has the structural formula:

$$HO-R''-\left[\begin{array}{cc} O & O \\ \| & \| \\ OC-R-C-O-R''' \end{array}\right]_n OH$$

wherein R, R'', R''' and n are as defined above. Obviously, if a mixture of glycols are used in the reaction R'' and R''' may or may not be the same.

Once the hydroxyalkyl dicarboxylic acid ester has formed, additional molecules of the dicarboxylic acid react with the hydroxyl group of the hydroxyalkyl ester to form additional ester groups. The desired length of the ultimate chain is obtained by adjusting the dicarboxylic acid-glycol ratio in the reaction. The ratio in each instance is determined experimentally. For isophthalic acid and ethylene glycol is for example about two moles of isophthalic acid to 3 moles of ethylene glycol produces a mixture of molecules in which n is an integer from two to five. The desired hydroxyl equivalent weight of these compositions is from about 250 to 500.

PREPARATION OF THE ESTER-MONOETHER AND ESTER-DIETHER

The above hydroxyalkyl dicarboxylic acid ester is reacted with acrylamide and formaldehyde to form the ester-monoether and ester-diether. In the reaction the ester component is usually employed in an amount of about 1 to 2 equivalents per equivalent of acrylamide. The formaldehyde is usually used in an amount of about 1.5 to two equivalents per equivalent of acrylamide. Excess formaldehyde can be present in the reaction mixture. The excess formaldehyde however does not enter into the reaction. A polymerization inhibitor such as hydroquinone is incorporated into the reaction mixture to prevent polymerization before radiation. The reaction can be conducted in a temperature range of about 105° C to 150° C and is preferably conducted in a temperature range of about 110° C to 125° C. Usually a water immiscible solvent such as toluene, xylene or benzene is employed.

When the reaction is taken totally to completion the product is substantially all ester-diether. When the reaction is terminated prior to total completion a mixture of the ester-diether and the ester-monoether exist.

PREPARATION OF THE MONOHYDROXY HYDROCARBON ESTERS OF ACRYLIC OR METHACRYLIC ACID

The monohydroxy esters of acrylic or methacrylic acid described above are known compounds and can be prepared by esterification of a dihydric alcohol containing 2 to 15 carbon atoms with acrylic or methacrylic acid. Typical of the monohydroxy esters of acrylic or methacrylic acid useful in the practice of this invention are hydroxyethyl acrylate having the structural formula:

and a hydroxyalkyl acrylate believed to have the structural formula below made from an acrylic ester sold under the tradename Cardura ® Ester E:

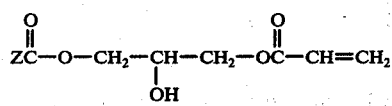

Z is an alkyl radical containing 9 to 11 carbon atoms. Its exact structure is unknown. As shown in the specific examples set out below hydroxy Cardura ® Ester E acrylate can be prepared by reacting Cardura ® Ester E sold under that tradename by Shell Chemical Co., with acrylic acid. Preferably the reaction is conducted in the presence of a amine which catalyzes the reaction. Also typical of the monohydroxy esters of acrylic or methacrylic acid is hydrogenated hydroxybisphenyl acrylate having the structural formula:

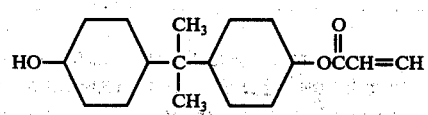

As set out in the specific examples below hydrogenated hydroxybisphenyl acrylate can be prepared by reacting acrylic acid with hydrogenated bisphenol A. The reaction is usually conducted in the presence of a catalyst such as p-toluene sulfonic acid. In the preparation of the monohydroxy esters of acrylic or methacrylic acid stabilizers such as hydroquinone are present in the reaction mixture to prevent polymerization. In general, the reactions can be conducted in a temperature range of about 120° C to 135° C. In the mixture of ester-monoether, ester-diether and hydroxyalkyl acrylate ester, the hydroxyalkyl acrylate ester is employed in an amount up to about 60 percent by weight based upon the weight of the ester-monoether and ester-diether mixture.

PREPARATION OF THE DIISOCYANATE DERIVATIZED MIXTURES

The reaction between the above ester-monoether and diisocyanates or between mixtures of the above ester-monoether and monohydroxy hydrocarbon esters of acrylic or methacrylic acid and diisocyanates can be conveniently conducted at a temperature between about 25° C and 100° C. At a temperature of about 25° C the reaction will go to completion in about twenty-four hours. At a temperature of about 100° C the reaction will go to completion in about one hour. The reaction is preferably conducted at a temperature between about 85° C and 95° C. Preferably, the reaction is conducted in the presence of a catalyst such as dibutyltin dilaurate, tri-n-octyltin oxide or stannous chloride. The diisocyanate is employed in the reaction in an amount of at least 50 equivalent percent of the available hydroxyl groups in the mixture.

The diisocyanate reacts to form a coupling between the hydroxyl groups of the components. Organic diisocyanates in general can be used. Illustrative of diisocyanates useful in the practice of this invention are those containing 6 to 40 carbon atoms and include aromatic diisocyanates such as benzene diisocyanate, toluene diisocyanate and xylene diisocyanate; aliphatic diisocyanates such as hexamethylene diisocyanate, dimethyl hexamethylene diisocyanate, cycloaliphatic diisocyanate such as isophorone diisocyanate long chain disocyanates such as polymeric fat acid diisocyanate (sometimes referred to as dimer diisocyanate).

The ester-ether mixtures and their above described diisocyanate derivatives can be cured by exposure to ultraviolet light or an electron beam. When ultraviolet light is used a sensitizing agent such as isobutyl benzoin ether is preferably employed to promote curing. Sensitizers are not generally used when radiation is by way of an electron beam.

The following examples are illustrative of the present invention but are not to be construed as limiting in scope.

Various tests are referred to in the following examples. Viscosity was measured by the Gardner method which can be found in ASTM D-1545-63. Color was measured by the Gardner method which can be found in AOCS Td 1A-64. The hydroxyl number was measured by the method set out in Analytical Chemistry, 1963, Vol. 35, pp. 571 to 573. Sward Rocker Hardness was measured according to ASTM D-2134-66.

PREPARATION OF ESTER-ETHERS

EXAMPLE I

Preparation of Azelaic Acid - Diethylene Glycol Ester-Ether

The following materials were charged to a two liter 3-necked flask equipped with an air driven stirrer, Stark and Dean Tube with a condenser, and a thermometer for reading the reaction mixture temperature. The flask was heated by a Mantle heater.

| Materials | Grams | Moles | Equiv. |
|---|---|---|---|
| Azelaic acid | 376 | 2 | 4 |
| Diethylene glycol | 318 | 3 | 6 |
| p-toluene sulfonic acid | 2.5 | | |
| Toluene | 100 cc | | |

The mixture was heated for six and one-half hours. The temperature reached 190° C in the first one and one-half hour and was maintained at that temperature by adding or removing toluene. Eighty four grams of water was separated. The product had an acid value of 1.0 and a hydroxyl value of 122.8.

The azelate ester was mixed with other reactants in the following amounts to make the ether.

| Materials | Grams | Moles | Equiv. |
|---|---|---|---|
| The above ester | 650 | 1.34 | 1.34 |
| Acrylamide | 67 | .94 | .94 |

-continued

| Materials | Grams | Moles | Equiv. |
|---|---|---|---|
| Sodium Acetate: 3 H O | 2.5 | | |
| Hydroquinone | 1.3 | | |
| Citric acid | 2.5 | | |
| 95% paraformaldehyde powder | 44 | 1.4 | 1.4 |
| Toluene | 150 cc | | |

The sodium acetate and citric acid were used to neutralize the p-Toluene sulfonic acid and buffer the mixture.

The reaction was run in a 2 liter 3-necked flask equipped with Stark and Dean tube, an air driven stirrer and a thermometer. The flask was heated by a mantle heater. The flask was charged with the ester-ether, acrylamide, sodium acetate, hydroquinone, citric acid, warmed to 60° C and the paraformaldehyde and toluene added. During a heating period of three hours the temperature reached 126° C and 30 grams of water and unreacted formaldehyde were removed. The product was filtered hot and then the toluene was stripped off in a rotary evaporator. The product had a hydroxyl value of 49.9. With 5% diethoxyacetophenone it cured to a slight tacky coating on paper after 5 passes under a 200 watt/inch UV Lamp at 60 feet per minute.

EXAMPLE II

Preparation of Ester-Ether From a Mixture of Isophthalic Acid and Terephthalic Acid and Ethylene Glycol The initial mixture of hydroxyethyl isophthalate and hydroxyethyl terephthalate was prepared by charging the following reactants into a two liter three necked flask equipped with an air driven stirrer, thermometer, and a Stark and Dean Tube with condenser. The flask was heated by a glass mantle heater.

| Materials | Grams | Moles | Equiv. |
|---|---|---|---|
| IPA-85* | 665.00 | 4.00 | 8.00 |
| Ethylene glycol | 496.00 | 8.00 | 16.00 |
| p-toluene sulfonic acid | 2.00 | | |
| Toluene | 100 cc | | |

*IPA-85 is a mixture of approximately 85% isophthalic acid and 15% terephthalic acid. It is sold by Amoco.

The stirred mixture was heated for 11 hours in which the pot temperature at reflux went from 116° to 180° C. A mixture of water and ethylene glycol amounting to 222 grams separated and was removed from the Stark and Dean Tube. The final product which included some toluene had an acid value of 1.7 and a hydroxyl value of 134.2.

The ester-ether of the above product mixture was made by charging the following materials into a one liter three necked flask equipped with an air driven stirrer, thermometer and Stark and Dean Tube.

| Materials | Grams | Moles | Equiv. |
|---|---|---|---|
| The above ester | 425.00 | 0.50 | 1.00* |
| Acrylamide | 71.00 | 1.00 | 1.00 |
| Sodium acetate | 1.00 | | |
| Hydroquinone | 1.00 | | |
| Paraformaldehyde (95% powder) | 39.65 | 1.25 | 1.25 |
| Toluene | 100 cc | | |

*Based on the hydroxyl value.

The above ester, hydroquinone and one half of the toluene were first charged to the reactor. The materials were stirred and warmed to 80° C, then the acrylamide was added and at 90° C the paraformaldehyde and the remainder of the toluene were added.

The stirred mixture was then heated for 1.5 hours in which the pot temperature rose to 125° C. During this time 22 grams of water plus some formaldehyde was removed from the Stark and Dean Tube. The final product had a hydroxyl value of 18.2. The resin was too viscous to spread. When diluted to 70% with trimethylol propane triacrylate the viscosity was 200 strokes. To this mixture 5% isobutyl benzoin ether was added and 0.5 mil films were applied to clay coated paper stock and to bonderized steel panels. The coated pieces were cured by passing under a 200 watt per inch UV lamp. The coatings cured tack free to foil in one pass at 250 feet per minute. The coating on the steel panel which was passed at 60 feet per minute had a Sward Rocker Hardness of 14.

EXAMPLE III

Preparation of Ester-Ether from Adipic Acid and Ethylene Glycol and Curing

The following materials were charged into a reactor to make the initial hydroxyethyl adipate. The reaction was carried out by the procedure set out in Example I except that a one liter flask was used.

| Materials | Grams | Moles | Equiv. |
|---|---|---|---|
| Adipic Acid | 292 | 2 | 4 |
| Ethylene glycol | 186 | 3 | 6 |
| p-t-sulfonic acid | 1 | | |
| Toluene | 100 cc | | |

The reaction esterification was conducted over a period of five hours. The reaction temperature reached 133° C. A total of 83 grams of water and some ethylene glycol was separated. The product had an acid value of five and a hydroxyl value of 193.7.

The following materials were charged to a one liter three necked flask equipped as described in previous example.

| Materials | Grams | Moles | Equiv. |
|---|---|---|---|
| The above ester | 332 | .575 | 1.15 |
| Acrylamide | 57 | .805 | .805 |
| Sodium acetate: 3 H O | 1 | | |
| Hydroquinone | .7 | | |
| Citric acid | 1.0 | | |
| 95% paraformaldehyde powder | 38.2 | 1.21 | 1.21 |
| Toluene | 50 cc | | |

The same procedure was followed as described in Example 1. The reaction was carried out over a period of three hours. The temperature reached 124° C. A total of 252 grams of water plus unreacted formaldehyde was obtained. The product had a hydroxyl value of 86.5. When mixed with 5% diethoxyl acetophenone and coated on clay coated label stock with a .5 mil doctor blade, it cured to a coating with a very slight tack after six passes under a 200 watts per inch lamp at a rate of 60 feet per minute.

EXAMPLE IV

Preparation of Ester-Ether from Adipic Acid and 1,4 Cyclohexane Dimethylol and Curing The initial 1,4 cyclohexane dimethylol-adipate acid ester was prepared with the following materials according to the procedure set out in Example II.

| Materials | Grams | Moles | Equiv. |
|---|---|---|---|
| Adipic acid | 292.00 | 2.00 | 4.00 |
| 1,4 cyclohexane dimethylol | 480.00 | 3.34 | 6.68 |
| p-toluene sulfonic acid | 0.80 | | |
| Toluene | 120 cc | | |

The reaction mixture was heated for four hours and reached a pot temperature of 125° C. Seventy-two grams of water was separated in the Stark and Dean Tube. The acid value of the unstripped material was 0.8 and the hydroxyl value was 183.8.

The ester ether of the above product mixture was made with the following materials according to the procedure set out in Example II.

| Materials | Grams | Moles | Equiv. |
|---|---|---|---|
| The above ester | 468.73 | .76* | 1.52* |
| Acrylamide | 71.00 | 1.00 | 1.00 |
| Hydroquinone | 0.80 | | |
| 95% paraformaldehyde powder | 39.60 | 1.25 | 1.25 |
| Toluene | 50 cc | | |

*Based on the hydroxyl value.

The reaction mixture was heated for two hours and the pot temperature reached 142° C. Twenty-four grams of water and some formaldehyde were recovered.

The product had a hydroxyl value of 66.2. To a mixture of 80% of the product and 20% of trimethylol propane triacrylate 5% butyl benzoin ether was added. A 0.5 mil film was spread on clay coated paper and cured tack free to foil after one pass at 60 feet per minute under a 200 watt per inch UV lamp.

EXAMPLE V

Preparation of the Ester-Ether from Adipic Acid and 1,6-Hexanediol and Curing

The initial hydroxyhexyl adipate was prepared with the following materials according to the procedure set out in Example II.

| Materials | Grams | Moles | Equiv. |
|---|---|---|---|
| 1,6 Hexanediol | 284.00 | 2.40 | 4.80 |
| Adipic acid | 220.00 | 1.50 | 3.00 |
| p-toluene sulfonic acid | 0.60 | | |
| Toluene | 100 cc | | |

After heating for 3.5 hours in which time the pot temperature reached 160° C the product had an acid value of 0.4 and a hydroxyl value of 189.5.

The ester-ether of the above product mixture was made with the following materials according to the procedure set out in Example II. Sodium acetate trihydrate was added to neutralize the p-toluene sulfonic acid.

| Materials | Grams | Moles | Equiv. |
|---|---|---|---|
| The above ester | 289.00 | .488* | .975* |
| Sodium acetate-trihydrate | 0.50 | | |
| Hydroquinone | 0.50 | | |
| Acrylamide | 46.70 | .66 | .66 |
| Acrylic acid | 5.00 | | |
| Paraformaldehyde (95% powder) | 31.60 | 1.00 | 1.00 |
| Toluene | 50 cc | | |

*Based on the hydroxyl value.

The acrylic acid was added at the same time the acrylamide was added at 50° C. The mixture was heated for three hours reaching a pot temperature of 129° C at which time 17 grams of water plus some acrylic acid and formaldehyde had separated. The product was filtered and a sample mixed with 5% butyl benzoin ether. This was spread in a 0.5 mil film on clay coated paper and cured by passing under a 200 watt per inch UV lamp at 60 feet per minute. It had a slight tack after two passes.

EXAMPLE VI

Preparation of Ester-Ether From Isophthalic Acid, Terephthalic Acid and Diethylene Glycol and Curing The initial ester was prepared with the following materials according to the procedure set out in Example II.

| Materials | Grams | Moles | Equiv. |
|---|---|---|---|
| IPA-85* | 332.00 | 2.00 | 4 |
| Diethylene glycol | 318.00 | 3.00 | 6 |
| p-toluene sulfonic acid | 1.00 | | |
| Toluene | 100 cc | | |

*See Example II.

After thirteen hours of heating the pot temperature reached 170° C and 81.5 grams of water had separated. The filtered product had an acid value of 11.8 and a hydroxyl value of 157.

The ester-ether of the above product mixture was made with the following materials according to the procedure set out in Example II.

| Materials | Grams | Moles | Equiv. |
|---|---|---|---|
| The above ester | 200.00 | .28* | 0.56* |
| 95% paraformaldehyde powder | 17.40 | .55 | 0.55 |
| Sodium acetate trihydrate | 0.50 | | |
| Hydroquinone | 0.40 | | |
| Toluene | 100 cc | | |

*Based on hydroxyl value.

During 2.5 hours reflux, 10.5 grams of water and some formaldehyde were obtained. The pot temperature reached 131° C at the end. The filtered product was stripped of toluene. It had a hydroxyl value of 90.3 and an acid value of 9.2. To a sample of 70% product and 30% trimethylol propane triacrylate, 5% butyl benzoin ether was added. This was coated on paper and on bonderized steel. The coating's cure tack free to foil in one pass at a rate of 60 feet per minute under a 200 watt per inch UV lamp. The Sward Rocker Hardness of the film on the bonderized steel was eight.

EXAMPLE VII

Preparation of Ester-Ether from Isophthalic Acid, Terephthalic Acid and Tetraethylene Glycol The initial mixture of esters was prepared by the procedure described in Example II using the following materials.

| Materials | Grams | Moles | Equiv. |
|---|---|---|---|
| IPA-85* | 166.00 | 1.00 | 2.0 |
| Tetraethylene glycol | 291.00 | 1.50 | 3.0 |
| p-toluene sulfonic acid | 1.00 | | |
| Toluene | 100 cc | | |

*See Example II.

After six hours of heating the pot temperature reached 198° C and 33 grams of water and other volatiles had separated. The final product which included toluene had an acid value of 5.8 and a hydroxyl value of 126.

The ester-ether of the above product mixture was made according to the procedure described in Example II, using the following materials.

| Materials | Grams | Moles | Equiv. |
|---|---|---|---|
| The above esters | 200.00 | .225* | 0.45* |
| Sodium acetate | 0.50 | | |
| Citric acid | 0.50 | | |
| Acrylamide | 21.10 | .297 | 0.297 |
| Hydroquinone | 0.50 | | |
| 95% paraformaldehyde powder | 14.00 | .445 | 0.445 |
| Toluene | 100 cc | | |

*Based on hydroxyl value.

The stripped product had a Gardner viscosity of Z 6 and a hydroxyl value of 72.3.

EXAMPLE VIII

Preparation of Ester-Ether From a Mixture of Isophthalic Acid, Terephthalic Acid, Maleic Anhydride, Diethylene Glycol and Curing of Said Ester-Ether The initial mixture of the diethylene glycol esters was prepared by the procedure described in Example II using the following materials.

| Materials | Grams | Moles | Equiv. |
|---|---|---|---|
| IPA-85* | 250.00 | 1.50 | 3.0 |
| Maleic anhydride | 73.50 | 0.75 | 1.5 |
| Diethylene glycol | 358.00 | 3.38 | 6.76 |
| Hydroquinone | 0.60 | | |
| p-toluene sulfonic acid | 1.00 | | |
| Toluene | 70 cc | | |

*See Example II.

After seven hours of heating the pot temperature 190° C and 79.6 grams of water and other volatiles had separated, the product still containing some toluene had an acid number of 3.9 and a hydroxyl value of 163.

The ester-ether of the above product mixture was made according to the procedure described in Example II using the following materials.

| Materials | Grams | Moles | Equiv. |
|---|---|---|---|
| The above esters | 599.00 | .87* | 1.74* |
| Acrylamide | 86.50 | 1.22 | 1.22 |
| Hydroquinone | 1.50 | | |
| Sodium acetate | 1.00 | | |
| Citric acid | 1.50 | | |
| 95% paraformaldehyde powder | 58.00 | 1.83 | 1.83 |
| Toluene | 70 cc | | |

*Based on hydroxyl value.

After three and a half hours of heating the pot temperature reached 131° C and 37.8 grams of water and formaldehyde were collected. The product stripped of toluene had a Gardner viscosity of Z 10 and a hydroxyl value of 61.8.

The ester-ether product were cured with reactive diluents.

| | Mixture Composition in Grams | |
|---|---|---|
| | Mixture 1 | Mixture 2 |
| Ester-Ether | 16.00 | 16.00 |
| Trimethylol Propane Triacrylate | 4.00 | 8.00 |
| Diethoxyacetophenone | 1.05 | 1.26 |

These mixtures were spread on clay coated label stock and on bonderized steel panels using a 0.5 mil doctor blade. The coatings cured tack free to foil after one pass under a 200 watt per inch UV lamp at a rate of 250 feet per minute. The Sward Rocker Hardness was at 60 feet per minute.

| No. of Passes | 1 | 5 | 9 |
|---|---|---|---|
| Mixture 1 | 12 | 19 | 22 |
| Mixture 2 | 15 | 26 | 31 |

The ester-ethers will cure to a tack free coating with 5% diethoxyacetophenone photo initiator with a nonreactant diluent such as toluene.

PREPARATION OF HYDROXYALKYL ACRYLATES

EXAMPLE IX

Preparation of Hydroxyalkyl Acrylate from Cardura ® Ester E

The following reactants were charged into a three liter round bottom flask equipped with an air driven stirrer, a dropping funnel, and a thermocouple controller to read temperature and furnish heat through a mantle heater.

| Materials | Grams | Moles | Equiv. |
|---|---|---|---|
| Cardura Ester ®E* | 980.00 | 4.00 | 4.00 |
| Acrylic Acid | 328.00 | 4.56 | 4.56 |
| Dimethylbenzyl amine | 5.00 | | |
| Hydroquinone | 2.80 | | |

*Trademark Shell Chemical Co.

The flask was charged with the ester, heated to a temperature of 125°–130° C and flushed with nitrogen. Dimethylbenzyl amine and hydroquinone were added and the heat removed. The acrylic acid was then added through the dropping funnel over a period of 15 minutes. Cooling was required during the addition to keep the temperature between 125° and 133° C. When there was no appreciable exothermic reaction the reaction mixture was maintained at a temperature of 130° C for an additional two hours. The product had an acid value of 15.3, a hydroxyl value of 186 and a Gardner Viscosity of D.

EXAMPLE X

Preparation of Hydrogenated Hydroxyl Bisphenyl Acrylate

The following materials were charged into a three liter three necked flask equipped with an air driven stirrer, a thermometer, a Stark and Dean Tube and an air sparge tube.

| Materials | Grams | Moles | Equiv. |
|---|---|---|---|
| Hydrogenated bisphenol A | 480.00 | 2.00 | 4.0 |
| Acrylic acid | 432.00 | 6.00 | 6.0 |
| p-toluene sulfonic acid | 1.4 | | |
| Hydroquinone | .76 | | |
| Toluene | 100 cc | | |

Air was slowly bubbled through the reaction mixture during the esterification. The temperature ranged from 123° C at the start to 131° C at the end of the esterification. A total of 102 grams of water plus acrylic acid separated during the esterification over a period of eight and one half hours. The product had an acid number of 91, a hydroxyl value of 176, and a Gardner Viscosity of Z 6-Z 7.

PREPARATION OF DILUENT

EXAMPLE XI

Preparation of Ether of Hydroxyethyl Acrylate

The following reactants were reacted by the procedure set out in Example IX.

| Materials | Grams | Moles | Equiv. |
|---|---|---|---|
| Hydroxyethyl Acrylate | 232.00 | 2.00 | 2.00 |
| Acrylamide | 142.00 | 2.00 | 2.00 |
| Hydroquinone | 0.70 | | |
| Paraformaldehyde (95% powder) | 95.00 | 3.00 | 3.00 |
| Toluene | 100 cc | | |

Hydroxyethyl acrylate, acrylamide and hydroquinone were charged into a reactor and heated to a temperature of 90° C. Paraformaldehyde and toluene were then added. The mixture was heated for an additional 2.5 hours while water was removed. The final temperature was 127° C. The product was then cooled and filtered. The product was then stripped of toluene under water pump vacuum by heating to a temperature at 90° C. The Gardner Viscosity of the product equaled F.

Alternate diluent such as trimethylol propane triacrylate can also be used to reduce viscosity during reaction and working of compositions.

PREPARATION OF DIISOCYANATE DERIVATIVES

EXAMPLE XII

Reaction of Ester-Ether From Diethylene Glycol and Azelaic Acid with Toluene Diisocyanate and Cure The following reactants

| Materials | Grams | Moles | Equiv. |
|---|---|---|---|
| Ester-Ether from Example I | 20 | 0.0179 | 0.0179* |
| Toluene diisocyanate | 1.4 | 0.008 | 0.0161 |

-continued

| Materials | Grams | Moles | Equiv. |
|---|---|---|---|
| Dibutyltin dilaurate | 2 drops | | |
| Toluene | 10 | | |

*Based on hydroxyl value.

The above materials were mixed in an eight oz. W.M. bottle and placed in a 80° C circulating air oven for one hour. The temperature was then raised to 90° C for two hours. The bottles were shaken periodically. At the end infrared analysis showed only a trace of free NCO. Part of the product was mixed with 5% diethoxy acetophenone and spread on clay coated label stock. The coating had a slight tack after one pass under a UV lamp (200 watts per hour) at a rate of 60 feet per minute. After four passes there was still a very slight tack which disappeared after an hour at room temperature.

EXAMPLE XIII

Reaction of Ester-Ether From Hydroxyethyl Azelate With Toluene Diisocyanate and Cure The following reactants

| Materials | Grams | Moles | Equiv. |
|---|---|---|---|
| Hydroxyethyl Ester-Ether (From Example I) | 10.47 10.47 | .09 .0093* | .09 .0093* |
| Toluene diisocyanate | 7.74 | .0445 | .089 |
| Dibutyltin dilaurate | 4 drops | | |

The above materials were mixed and left to stand at room temperature for five days. Coatings were made with a 0.5 mill doctor blade on dry coated label stock and on a bonderized steel panel.

The coating on paper cured tack free to foil after one pass under a 200 watt per inch UV lamp at a rate of 250 feet per minute. The Sward Rocker Hardness of the film on bonderized steel was 23 after one pass at a rate of 60 feet per minute.

EXAMPLE XIV

Reaction of Ester-Ether From Hydroxyethyl Azelate With Hydroxyalkyl Acrylate, Cardura ® Ester E and Toluene Diisocyanate and Cure The following reactants

| Materials | Grams | Moles | Equiv. |
|---|---|---|---|
| Ester-Ether (From Example I) | 10.43 | .0093 | .0093 |
| Hydroxy Cardura ®E, (From Example IX) | 10.43 | .0327 | .0327 |
| Toluene diisocyanate | 3.29 | .0189 | .0379 |
| Dibutyltin dilaurate | 4 drops | | |

The above materials were reacted and cured in the same manner described in Example XIII. The coating took four passes under the 200 watt per inch UV lamp at 60 feet per minute to cure tack free to foil.

EXAMPLE XV

Reaction of Ester-Ether From Hydroxyethyl Azelate, With Hydrogenated Hydroxy Bisphenyl Acrylate and Toluene Diisocyanate and Cure The following reactants

| Materials | Grams | Moles | Equiv. |
|---|---|---|---|
| Ester-Ether (From Example I) | 10.35 | .0095 | .0095 |
| Hydrogenated hydroxy bisphenyl acrylate | 10.35 | .0322 | .0322 |
| Toluene diisocyanate | 2.16 | .0124 | .0248 |
| Dibutyltin dilaurate | 4 drops | | |
| Toluene (diluent) | 2.5 | | | were reacted and cured as described in Example XIV. The coating on paper cured tack free to foil in one pass at 250 feet per minute under the UV lamp. The coating on metal had a Sward Rocker Hardness of 23 after one pass at 60 feet per minute under the UV lamp (200 watts per inch).

EXAMPLE XVI

Reaction of Ester-Ether From Hydroxyethyl Azelate With Hydrogenated Hydroxy Bisphenyl Acrylate Isophorone Diisocyanate and Cure The following reactants

| Materials | Grams | Moles | Equiv. |
|---|---|---|---|
| Hydrogenated hydroxy bisphenyl acrylate (From Example X) | 10.00 | .007* | .007* |
| Ether-Ester (From Example I) | 10.00 | .086 | .086 |
| Isophorone diisocyanate | 2.95 | | |
| Dibutyltin dilaurate | 2 drops | | |

*Based on the hydroxyl value.

were charged into a reactor. The reaction and curing were carried out as described in Example XV. The viscosity of the mixture was Gardner Z 6. The Sward Rocker Hardness of the cured film was 28.

EXAMPLE XVII

Reaction of Ester-Ether from Hydroxyethyl Azelate With Toluene Diisocyanate and Cure An ester-ether urethane with Trimethylol propane Triacrylate non-reacting diluent was prepared as follows:

The following materials were reacted.

| Materials | Grams | Moles | Equiv. |
|---|---|---|---|
| Ester-Ether (From Example I) | 100 | .154 | .154 |
| Toluene diisocyanate | 148 | .170 | .170 |
| Trimethylol propane triacrylate | 50 | | |
| Dibutyltin dilaurate | 5 drops | | |

The above materials were mixed in an eight oz W.M. bottle and placed in a 80° C circulating air oven for one hour. The temperature was then raised to 90° C for two hours. The bottles were shaken periodically. At the end infrared analysis showed only a trace of free NCO. Part of the product was mixed with 5% diethoxy acetophenone and spread on clay coated label stock and on a bonderized steel panel using a .5 mil doctor blade.

Part of the product was mixed with 50% diethoxy acetophenone and coated on label stock and on bonderized steel using a .5 mil doctor blade. The coating on paper was tack free to foil after one pass at 250 feet per minute. The Sward Rocker Hardness of the coating on bonderized steel was 13 after one pass at a rate of 60 feet per minute under a UV lamp (200 watts per inch).

A second urethane was made using toluene as the non-reactive diluent.

| Materials | Grams | Moles | Equiv. |
|---|---|---|---|
| Adipic EG ester ether | 20 | .0154 | .0308 |
| Toluene diisocyanate | 2.97 | .0160 | .0321 |
| Toluene | 10 | | |
| Dibutyltin dilaurate | 2 drops | | |

When mixed with 5% diethoxy acetophenone and spread on clay coated label stock with a 0.5 mil doctor blade, the coating cured to a slight tack by a UV lamp (200 watts per inch) after one pass at 250 feet per minute and was tack free to foil after four passes at a rate of 60 feet per minute.

EXAMPLE XVIII

Reaction of Ester-Ether From Hydroxyhexyl Adipate With Toluene Diisocyanate and Cure The following materials were reacted.

| Materials | Grams | Moles | Equiv. |
|---|---|---|---|
| Ester-Ether (From Example V) | 20.00 | .0248 | .0248* |
| Toluene Diisocyanate | 2.40 | .0135 | .0270 |
| Dibutyltin dialurate | 3 drops | | |

*Based on hydroxyl value.

at room temperature over a period of 72 hours. To this was added 5% butyl benzoin ether and a 0.5 mil film spread on clay coated paper. The coating cured tack free to foil in four passes at 60 feet per minute under the UV lamp (200 watts per inch).

EXAMPLE XIX

Reaction of Ester-Ether From Diethylene Glycol and a Mixture of Isophthalic Acid and Terephthalic Acid and Trimethylol Propane Triacrylate With Toluene Diisocyanate and Cure A starting ester-ether prepared as in Example VIII having a hydroxyl number of 69.5 was used. The proportions of the reactants are set out below.

| Materials | Grams | Moles | Equiv. |
|---|---|---|---|
| Ester-Ether (Example VIII) | 20.00 | .0248* | .0248* |
| Trimethylol propane triacrylate | 15.00 | | |
| Toluene diisocyanate | 2.30 | .0132 | .0265 |
| Dibutyltin dilaurate | 3 drops | | |

*Based on hydroxyl value.

The reaction mixture was allowed to stand over night at room temperature. The resulting product had a Gardner Viscosity of Z 8 to Z 9. It was mixed with 5% butyl benzoin ether and spread over clay coated paper and on bonderized steel panels using an 0.5 mil doctor blade. The coating was cured by passing it below a 200 watt per inch UV lamp at a rate of 250 feet per minute. The coatings were tack free to foil after one pass. After one pass at the rate of 60 feet per minute under a UV 200 watt per inch lamp, the product had a Sward Rocker Hardness of 20.

EXAMPLE XX

Reaction of Ester-Ether From Tetraethylene Glycol and Isophthalic and Terephthalic Acid and Trimethyl Propane Triacrylate with Toluene Diisocyanate The following materials

| Materials | Grams | Moles | Equiv. |
|---|---|---|---|
| Ester-Ether (From Example VII) | 30.70 | .0397 | .0397 |
| Trimethyl propane triacrylate | 15.30 | | |
| Toluene diisocyanate | 3.00 | .0173 | .0346 |
| Dibutyltin dialurate | 4 drops | | | were mixed in a screw lipped bottle and put into a 70° C oven for a period of one hour. The temperature was then raised to 90° C for a period of two hours. The bottle was shaken occasionally. The product was then mixed with 5% diethoxy acetophenone. The mixture was applied to clay coated paper and to bonderized steel panels using a 0.5 mil doctor blade. The samples were cured under a UV lamp (200 watt per square inch). The coatings cured tack free to foil in one pass at the rate of 125 feet per minute. The coating on the steel panel had a Sward Rocker Hardness of 10 after one pass at the rate of 60 feet per minute.

EXAMPLE XXI

Reaction of Ester-Ether From Diethylene Glycol, Isophthalic Acid, Terephthalic Acid and Maleic Acid with Toluene Diisoycanate and a Reactive Diluent and Cure The following materials

| Materials | Sample 1 Grams | Sample 2 Grams |
|---|---|---|
| Ester-Ether (From Example VIII) | 16.00 | 16.00 |
| Hydroxyethyl acrylate | | 8.00 |
| Toluene Diisocyanate | 1.37 | 1.37 |
| Dibutyltin dilaurate | 3 drops | 3 drops |
| Trimethylol propane triacrylate | 8.00 | | were reacted spread and cured according to the procedure set out in Example VIII.

Sample 1 cured to tack free to foil in one pass under the 200 watt per inch UV lamp at a rate of 250 feet per minute.

Sample 2 cured to tack free to foil in one pass under the 200 watt per inch UV lamp at a rate of 125 feet per minute.

The Sward Rocker Hardness is shown below for the number of passes shown below.

| No. of passes at 60 feet per minute | 1 | 5 | 9 |
|---|---|---|---|
| Sample 1 | 10 | 15 | 21 |
| Sample 2 | 21 | 28 | 33 |

The ester-ether urethane will also cure to a tack free to foil coating when diluted with toluene rather than the reactive diluent, trimethylol propane triacrylate.

EXAMPLE XXI

Reaction of Ester-Ether From Azelaic Acid - Diethylene Glycol With Toluene Diisocyanate Using Trimethyl Propane Triacrylate Diluent and Cure An ester-ether-urethane with trimethyl propane triacrylate reactive diluent was prepared as follows:

| Materials | Grams | Moles | Equiv. |
|---|---|---|---|
| Ester-Ether (From Example I) | 100 | .0895 | .0895 |
| Toluene Diisocyanate | 7 | .0805 | .0402 |
| Trimethylol propane Triacrylate | 50 | | |
| Dibutyltin dilaurate | 5 drops | | |

The above materials were mixed in an eight oz. W.M. bottle and placed in a 80° C circulating air oven for one hour. The temperature was then raised to 90° C for two hours. The bottles were shaken periodically. At the end infrared analysis showed only a trace of free NCO. Part of the product was mixed with 5% diethoxy acetophenone and spread on clay coated label stock and on a bonderized steel panel using a .5 mil doctor blade. The coatings were cured in the usual manner under a UV lamp.

The coating on paper cured tack free to foil in one pass at a rate of 250 feet per minute under a 200 watt per inch UV lamp. The Sward Rocker Hardness of the coating on steel was 13 after one pass at a rate of 60 feet per minute.

The embodiments of the invention in which an exclusive porperty or privilege is claimed are defined as follows:

1. The diisocyanate derivative of the formula:

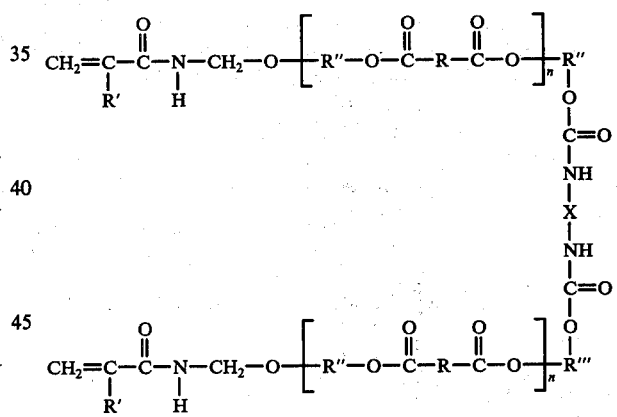

wherein X is an aromatic hydrocarbon, cycloaliphatic hydrocarbon or aliphatic hydrocarbon group containing 4 to 38 carbon atoms, R is an aliphatic hydrocarbon or aromatic hydrocarbon group containing four to eight carbon atoms, R' is hydrogen or a methyl group, R" is an aliphatic hydrocarbon group containing two to eight carbon atoms with the proviso that the aliphatic hydrocarbon group can contain ether linkages, R''' is an aliphatic hydrocarbon group containing two to eight carbon atoms with the priviso that the aliphatic hydrocarbon group can contain ether linkages, R" and R''' when containing ether linkages have the formulae ($-R_a-O-R_b-$)—, $-(R_a-O-R_b-O-R_c)-$ or $-(-R_a-O-R_b-O-R_c-O-R_d)-$ wherein $R_a$, $R_b$, $R_c$ and $R_d$ are alkylene groups containing in total from four to eight carbon atoms, and n is an integer from two to five.

2. The composition of claim 1 wherein X is an aromatic hydrocarbon group derived from toluene diisocyanate.

* * * * *